United States Patent

[11] 3,577,778

[72] Inventor Gunar Liepins
1215 Wines Drive, Ann Arbor, Mich. 48103
[21] Appl. No. 838,228
[22] Filed July 1, 1969
[45] Patented May 4, 1971

[54] TORQUE MEASURING TOOL
9 Claims, 5 Drawing Figs.
[52] U.S. Cl. .................................................. 73/139
[51] Int. Cl. .................................................. G01l 5/24
[50] Field of Search .......................................... 73/136, 139, 1

[56] References Cited
UNITED STATES PATENTS
| | | | |
|---|---|---|---|
| 2,219,632 | 10/1940 | Naden .......................... | 73/139 |
| 2,363,611 | 11/1944 | Newell ......................... | 73/70.1(X) |
| 2,690,335 | 9/1954 | Ballard .......................... | 267/57.1(X) |
| 3,057,194 | 10/1962 | Waters et al. .................. | 73/139 |
| 3,108,472 | 10/1963 | Scyocurka ..................... | 73/139 |
| 3,125,983 | 3/1964 | Valus ............................. | 73/70.1 |

*Primary Examiner*—Charles A. Ruehl
*Attorney*—Olsen and Stephenson

ABSTRACT: A torque wrench which is particularly adapted for supporting an Allen-type wrench and for indicating the torque that is applied. A shaft is provided on one end of which is mounted a chuck, the shaft being slotted to permit insertion of the Allen-type wrench through the chuck. A hollow transparent plastic handle is connected to the other end of the shaft by an elastomeric coupling, and a torque indicator mechanism extends between the shaft and the handle and is visible through the transparent handle to indicate the torque applied to the Allen-type wrench.

Patented May 4, 1971

3,577,778

INVENTOR
GUNAR LIEPINS

BY Olsen and Stephenson
ATTORNEYS

3,577,778

1
TORQUE MEASURING TOOL

BACKGROUND OF THE INVENTION

The present invention relates to an improved torque measuring tool especially adapted for use with wrenches of the Allen-type, but which can be used with other types of screw or nut driving tools.

In many types of assembly work, various parts are secured together by Allen-type screws, and often it is important that these screws are secured with the proper tightness. If the screws are too loose, the parts will not be secured together properly, and if they are tightened too much, there is danger of stripping the threads of the screws or the tapped openings into which these screws have been driven. Efforts have been made to provide wrenches for measuring the torque applied to Allen-type wrenches, such as is taught by the U.S. patent to Bailey, U.S. Pat. No. 3,283,620, issued Nov. 8, 1966. Wrenches of this type are suitable for single specific applications, but they are not readily adaptable for general use, nor do they permit use of conventional L-shaped Allen-type wrenches.

The prior art also has failed to provide a simplified low-cost assembly which permits direct reading of the torque applied, which is useable with drive tools of a variety of sizes, and which has a minimum number of linkages and other movable elements so as to assure low-cost construction and uniformly optimum operating results.

SUMMARY OF THE INVENTION

The present invention provides a torque measuring tool which has been constructed and arranged to overcome the shortcomings of the prior art and to permit its use with any conventional drive tool, such as an Allen-type wrench of any selected size whereby torque of any magnitude can readily be measured.

According to one form of the present invention, a torque measuring tool is provided comprising a shaft member having means at one end for mounting an elastomeric coupling, a chuck for holding a drive tool is mounted on the other end of the shaft member, said shaft member having a diametrical slot extending lengthwise adjacent to said other end and an axial bore communicating with the interior of the chuck so that an L-shaped drive tool, such as an Allen-type wrench, can be positioned with one leg extending through said chuck and the other leg extending transversely of the shaft in the slot. A transparent hollow handle member is mounted on the other end of the shaft member by means of an elastomeric coupling, the coupling interconnecting these members for transmitting torque from the handle member to the shaft member. A torque indicator mechanism is coupled to the shaft and the handle for indicating the torque transmitted from the handle to the shaft member. By virtue of this arrangement the torque applied to the Allen-type wrench supported in the chuck can be read directly through the transparent handle. Also, the torque indicator mechanism is a very simple mechanism representing the only pivotal elements in the assembly, thereby assuring optimum life and operating results from the tool.

Accordingly, it is one of the objects of the present invention to provide an improved torque measuring tool that is particularly adapted for use with wrenches, such as the Allen-type wrench, and which is constructed and arranged to permit use of any size of Allen-type wrench and to measure torque applied to such wrench over a relatively wide range.

It is another object of the present invention to provide an improved torque measuring tool which is characterized by the simplicity of its mechanism for measuring the torque applied.

Other objects of this invention will appear in the following description and appended claims, reference being had to the accompanying drawing forming a part of this specification wherein like reference characters designate corresponding parts in the several views.

2
BRIEF DESCRIPTION OF THE DRAWING

DESCRIPTION OF THE PREFERRED EMBODIMENT

Figure 1:
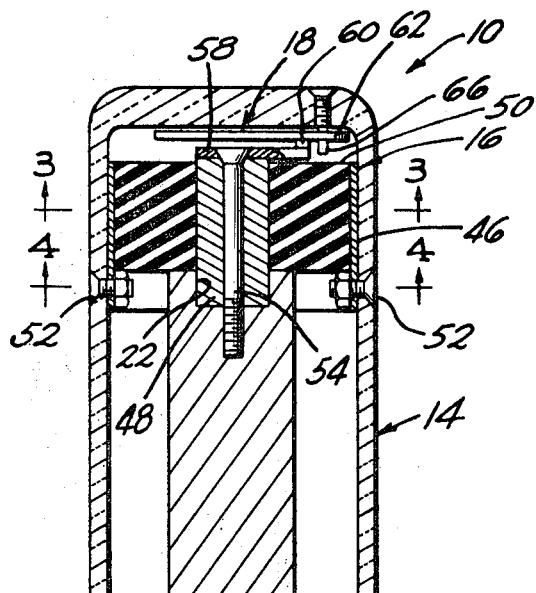
FIG. 1 is a front elevational view, partly in section, illustrating one embodiment of the present invention.
Figure 2:
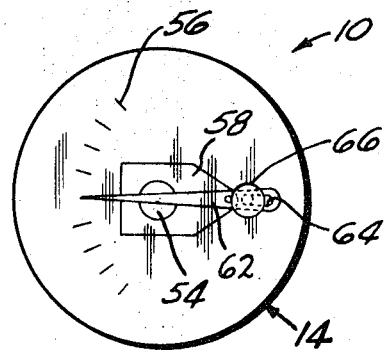
FIG. 2 is a top plan view of the embodiment of the invention.
Figure 3:
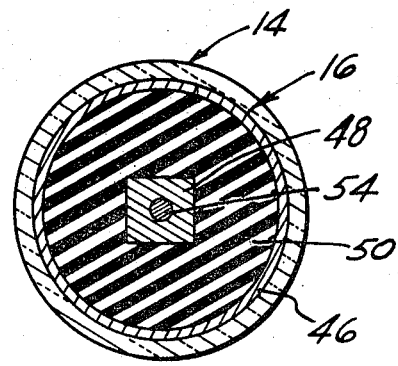
FIG. 3 is a transverse section taken on the line 3–3 of FIG. 1.
Figure 4:
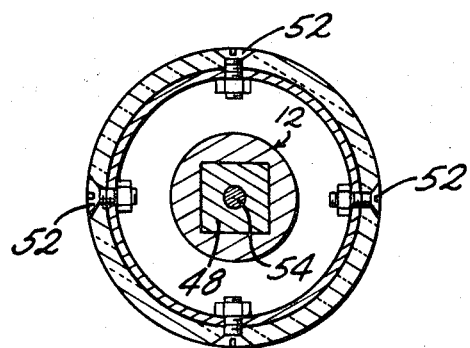
FIG. 4 is a transverse section taken on the line 4–4 of FIG. 1.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The torque measuring tool 10 comprises a shaft member 12, a handle member 14, an elastomeric coupling or torsion spring 16 interconnecting the shaft 12 and the handle 14, a torque indicator mechanism 18 for measuring torque transmitted from the handle member 14 through the elastomeric coupling 16 to the shaft member 12, and a jaw chuck 20 threadedly connected to the end of the shaft member 12.

Figure 5:
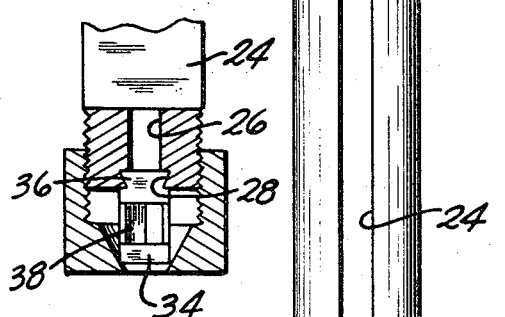
FIG. 5 is a longitudinal fragmentary section taken on the lines 5–5 of FIG. 1.

The shaft member 12 has a noncircular or square socket 22 in its one end, a longitudinal slot 24 extending to a location adjacent to the other end, and an axial bore 26 providing communication between the slot 24 and the end of the shaft member 12. As can be seen best in FIG. 5, a transverse trapezoidal-shape keyway 28 extends transversely of the shaft member 12 for a purpose to be described.

The jaw chuck 20 includes the tapered nut 30 which is threadedly connected to the end of the shaft member 12, and a pair of jaws 32 and 34, each of which has a trapezoidal key 36 at its upper end adapted to slide transversely of shaft member 12 in the keyway 28. The facing surfaces 38 of each of the jaws has a vertical hexagonal groove which are especially adapted to holding the drive tool, such as the Allen-type wrench. The jaws 34 and 32 have interfitting portions 40 to assure proper locking of the jaws together when a drive tool is retained within the hexagonal grooves.

The outside surfaces 42 and 44 of the jaws are shaped to conform to the inner surface of the tapered nut, so that when the nut is advanced upwardly on the shaft member 12, the tapered surfaces of the tapered nut 30 will act upon the corresponding surfaces of the jaws to move the same together, and when the nut is turned in the opposite direction, the jaws will release their holding action upon any tool that is retained therein.

From this description, it can be seen that an Allen-type wrench or any other L-shaped drive tool can be inserted into the slot 24 with one leg of the tool remaining transverse of the slot or shaft member 12, and the other leg can be advanced axially through the bore 26 and through the open jaws 32 and 34. Thereafter, the tapered nut 30 can be screwed inwardly so as to effect a clamping action of the jaws 32 and 34 on the tool extending therethrough. It can also be seen that a straight tool can be inserted axially through the chuck 20 and secured in place, if desired.

The elastomeric coupling 16 includes the generally cylindrical shell 46, the inner hub 48 and the body member 50 which can be made of rubber or any synthetic rubberlike or plastic material having elastomeric properties. The outer shell 46 preferably is made of thin sheet metal which is bonded to the outer surface of the elastomeric body member 50, and extends beyond the end of the body member 50 to permit suitable fastening means, such as the screws and nuts 52 to be used for fastening the elastomeric coupling to the handle member 14. The inner hub 48 is also preferably made of a rigid or metallic substance, and is preferably noncircular or square in cross section and of a shape so that a projecting portion is seated against turning in the socket 22 in the end of the shaft member 12. The inner hub 48 is secured in place in the socket 22 by any suitable means, such as the screw 54.

The handle member 14 preferably is molded form a suitable transparent organic plastic material and includes at its upper end calibrated scale indicia 56 which can be formed in the handle during the molding operation or can be added thereafter.

The torque indicating mechanism 18 includes a plate 58 which is secured to the upper end of the inner hub 48 by means of the screw 54, and it includes an extension on which a pivot pin 60 projects upwardly in parallel relationship with the axis of the shaft member 12. The pivot pin 60 has an upper portion of reduced diameter so that a shoulder is provided on which the needle 62 can be seated for pivotal movement. The needle includes a longitudinal slot 64 into which extends a pin 66 which is threadedly connected to the upper end of the handle member 14. By virtue of this arrangement, relative turning of handle member 14 relative to shaft member 12 resulting from the application of torque being applied to a tool held in chuck 20 will cause deflection of needle 62. The extent of the deflection will be observed relative to the indicia 56.

Thus, a simple, low-cost torque measuring tool has been provided which can be used as a wrench and simultaneously to measure the magnitude of torque applied by a variety of different tools of different sizes.

I claim:

1. A torque measuring tool comprising a shaft member, a hollow handle member enclosing one end of said shaft member, an elastomeric coupling interconnecting said members for transmitting torque from said handle member to said shaft member, a torque indicator mechanism coupled between said members for measuring the torque transmitted from said handle member to said shaft member, a jaw chuck mounted on the other end of said shaft member, said shaft member having a transverse slot extending longitudinally adjacent to said other end to permit insertion of one leg of an L-shaped drive tool through said chuck while the other leg is retained transversely in said slot.

2. A torque measuring tool as is defined in claim 1, wherein said other end of the shaft member has a transverse keyway, and chuck jaws are slidable in said keyway for retaining said drive tool.

3. A torque measuring tool as is defined in claim 1, wherein said hollow handle member is transparent, and said torque indicator mechanism includes calibrated scale indicia on said handle member to indicate the magnitude of torque transmitted from said handle member to said shaft member.

4. A torque measuring tool comprising a shaft member, a hollow handle member enclosing one end of said shaft member, an elastomeric coupling interconnecting said members for transmitting torque from said handle member to said shaft member, and a torque indicator mechanism coupled between said members for measuring the torque transmitted from said handle member to said shaft member, said elastomeric coupling including a body of elastomeric material, an outer shell bonded to the outer surface of said body, and an inner hub extending through and bonded to the inner surface of said body, said shell and said hub having end portions projecting beyond the body member, said end portions being secured respectfully to said handle and shaft members.

5. A torque measuring tool as is defined in claim 4, wherein said inner hub has a noncircular cross section and said shaft member has a mating socket in its one end for retaining the projecting end portion of the hub against relative rotation.

6. A torque measuring tool as is defined in claim 4, wherein said torque indicating mechanism includes a pivot pin mounted on said hub in spaced parallel relation to the axis of the hub, an indicator needle pivotally mounted on said pivot pin and having a longitudinal slot therein, and a pin mounted on said handle in spaced parallel relation to said pivot pin and extending into said slot.

7. A torque measuring tool as is defined in claim 6, wherein said hollow handle member is transparent and has indicia adjacent to said needle to indicate the magnitude of torque transmitted from said handle member to said shaft member.

8. A torque measuring tool comprising a shaft member having in its one end a socket, a chuck for holding a drive tool mounted on the other end of said shaft member, said shaft member having a transverse slot adjacent to said other end and an axial bore communicating with the interior of said chuck so that an L-Shaped drive tool can be positioned with one leg extending through chuck and the other leg located transversely of the shaft in said slot, a hollow handle member enclosing said one end of the shaft member, an elastomeric coupling interconnecting said members for transmitting torque from said handle member to said shaft member, said coupling including a body of elastomeric material, an outer shell secured to said handle member and an inner hub projecting axially through said body and secured in said socket and a torque indicator mechanism coupled between said members for indicating the torque transmitted from said handle member to said shaft member.

9. A torque measuring tool comprising a shaft member having means at its one end for mounting an elastomeric coupling, a chuck for holding a drive tool mounted on the other end of said shaft member, said shaft member having a transverse slot adjacent to said other end and an axial bore communicating with the interior of said chuck so that an L-shaped drive tool can be positioned with one leg extending through said chuck and the other leg located transversely of the shaft in said slot, a hollow handle member enclosing said one end of the shaft member, a torsion spring mounted on said one end of the shaft member interconnecting said members for transmitting torque from said handle member to said shaft member, and a torque indicator mechanism coupled between said members for indicating the torque transmitted from said handle member to said shaft member.